(12) United States Patent
Wang et al.

(10) Patent No.: US 9,128,549 B2
(45) Date of Patent: Sep. 8, 2015

(54) TOUCH PANEL AND TOUCH DISPLAY PANEL USING THE SAME

(71) Applicant: HengHao Technology Co. LTD, Taoyuan County (TW)

(72) Inventors: Ming-Hsi Wang, New Taipei (TW); Yu-Jen Chen, Pingtung County (TW)

(73) Assignee: Henghao Technology Co., Ltd., Taoyuan County (TW)

( * ) Notice: Subject to any disclaimer, the term of this patent is extended or adjusted under 35 U.S.C. 154(b) by 345 days.

(21) Appl. No.: 13/675,904

(22) Filed: Nov. 13, 2012

(65) Prior Publication Data

US 2013/0135230 A1 May 30, 2013

(30) Foreign Application Priority Data

Nov. 29, 2011 (TW) ................................ 100222566 U

(51) Int. Cl.
G06F 3/041 (2006.01)
(52) U.S. Cl.
CPC ..................................... *G06F 3/041* (2013.01)

(58) Field of Classification Search
CPC combination set(s) only.
See application file for complete search history.

(56) References Cited

U.S. PATENT DOCUMENTS

| | | | |
|---|---|---|---|
| 6,411,357 B1* | 6/2002 | Ting et al. ...................... | 349/141 |
| 2001/0046017 A1* | 11/2001 | Niwano et al. ................ | 349/141 |
| 2007/0268265 A1* | 11/2007 | XiaoPing ....................... | 345/173 |
| 2013/0092520 A1* | 4/2013 | Lee et al. ....................... | 200/600 |
| 2013/0106739 A1* | 5/2013 | Lee et al. ....................... | 345/173 |
| 2013/0135229 A1* | 5/2013 | Wang et al. ................... | 345/173 |
| 2013/0215082 A1* | 8/2013 | Mi .................................. | 345/174 |

* cited by examiner

*Primary Examiner* — Van Chow
(74) *Attorney, Agent, or Firm* — Donald E. Stout; Stout, Uxa & Buyan, LLP

(57) ABSTRACT

A touch panel and a touch display panel using the same are provided. The touch panel includes a cover glass and a touch substrate. The cover glass includes a first base and a signal line layer. The signal line layer is formed on a peripheral portion of the first base. The touch substrate is connected to the cover glass and comprises a second base and a sensing structure layer. The sensing structure layer is formed on the second base.

7 Claims, 5 Drawing Sheets

TOUCH PANEL AND TOUCH DISPLAY PANEL USING THE SAME

CROSS-REFERENCE TO RELATED APPLICATIONS

The entire contents of Taiwan Patent Application No. 100222566, filed on Nov. 29, 2011, from this application claims priority, are incorporated herein by reference.

BACKGROUND OF THE INVENTION

1. Field of the Invention

The invention relates in general to a touch panel and a touch display panel using the same, and more particularly to a touch panel capable with the signal transmission lines and a touch display panel using the same.

2. Description of the Related Art

The conventional touch panel includes a substrate, a sensing layer and a plurality of signal transmission lines. The signal transmission lines and the sensing layer are both formed on the substrate. The signal transmission lines are connected to the sensing layer to transmit a sensing signal from the sensing layer to a circuit.

However, as being limited by the size of the touch panel, the width of each signal transmission line is so thin that the impedance of the signal transmission line becomes quite large the substrate, which may result in a poor signal transmission.

SUMMARY OF THE INVENTION

The invention is directed to a touch panel and a touch display panel using the same. The signal transmission lines of the touch panel, having the low impedance, are capable of improving the transmission quality of the sensing signal.

According to an embodiment of the present invention, a touch panel is provided. The touch panel includes a cover glass and a touch substrate. The cover glass includes a first base and a signal line layer. The signal line layer is formed on a peripheral portion of the first base. The touch substrate is connected to the cover glass and includes a second base and a sensing structure layer. The sensing structure layer is formed on the second base.

According to another embodiment of the present invention, a touch display panel is provided. The touch display panel includes a display panel and a touch panel. The touch panel includes a cover glass and a touch substrate. The cover glass includes a first base and a signal line layer. The signal line layer is formed on a peripheral portion of first base. The touch substrate is connected to the cover glass and includes a second base and a sensing structure layer. The sensing structure layer is formed on the second base.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
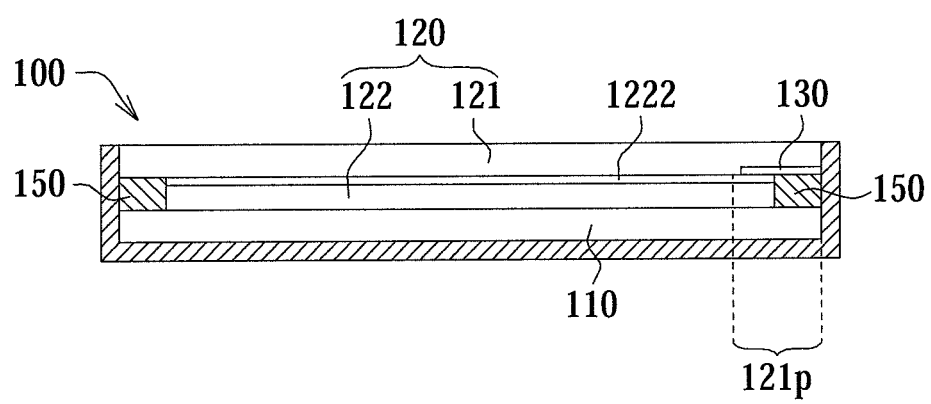
FIG. 1 shows a cross-sectional view of a touch panel according to an embodiment of the invention.

Referring to FIG. 1, a touch display panel according to an embodiment of the invention is shown. The touch display panel 100 includes a display panel 110, a touch panel 120, a signal line layer 130 and an adhesive part 150. The display panel 110 and the touch panel 120 are connected to each other by the adhesive part 150, wherein the adhesive part 150 is such as a double sided adhesive.

The display panel 110 may be any types of display panels such as an electrophoretic display, a cholesterol LCD, a liquid crystal, a bi-stable display, a multi-stable display, an organic light-emitting diode (OLED) display or a light-emitting diode (LED) display.

In the present embodiment, the touch panel is a capacitive touch panel.

As indicated in FIG. 1, the touch panel 120 includes a cover glass 121 and a touch substrate 122. The touch substrate 122 may be attached to the cover glass 121 with a transparent optical cement (not shown).

Figure 2:
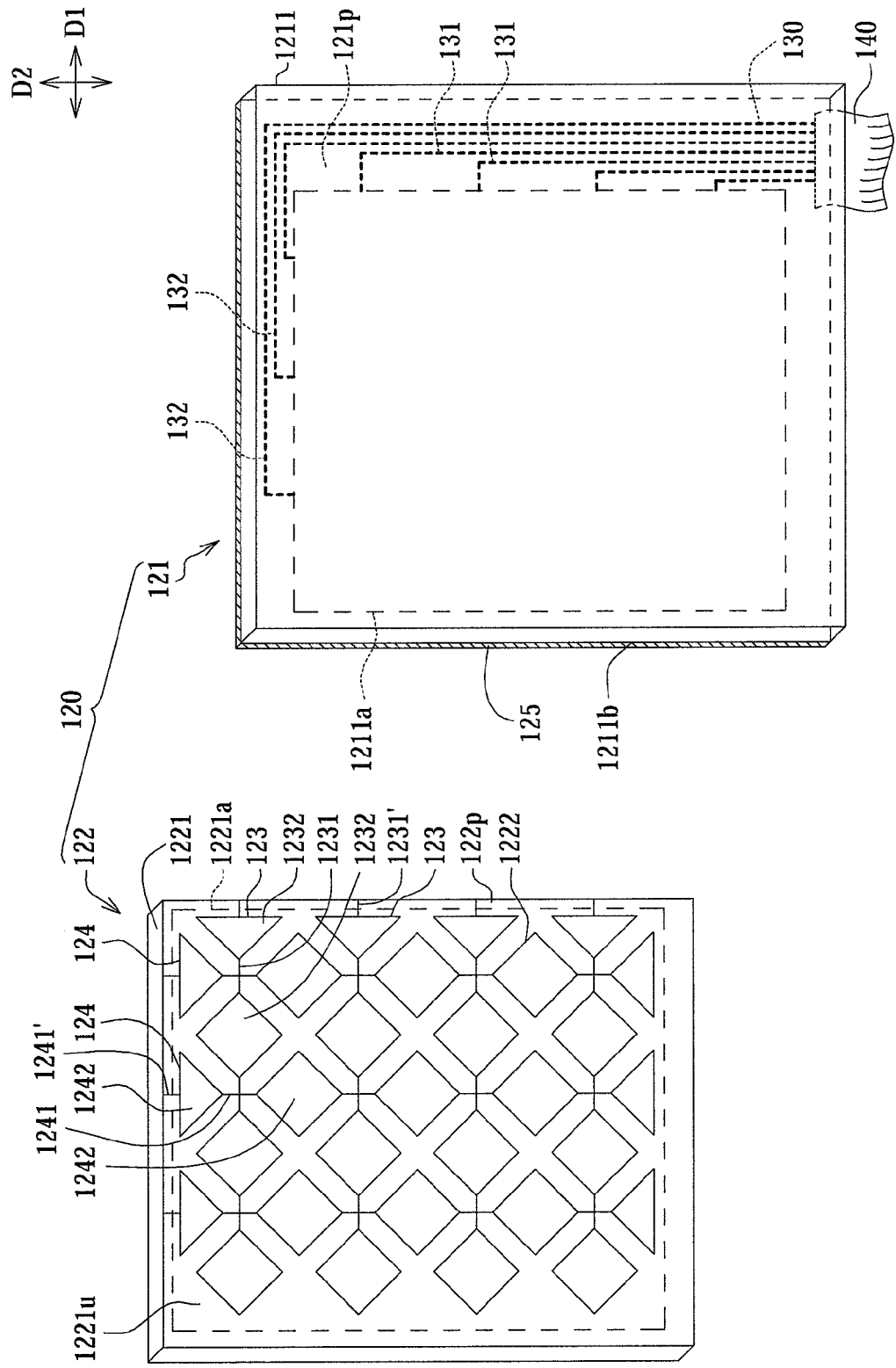
FIG. 2 shows the touch substrate and the cover glass in FIG. 1.

Referring to FIG. 2, FIG. 2 shows the touch substrate and the cover glass in FIG. 1. The touch substrate 122 includes a second base 1221 and a sensing structure layer 1222.

The second base 1221 is a transparent the substrate, made from a high transmittance insulating material, such as glass, polycarbonate (PC), polyethylene terephthalate (PET), polymethylmethacrylate (PMMA) or cyclic olefin copolymer.

The second base 1221 has an upper surface 1221$u$, a sensing structure layer 1222 formed on the upper surface 1221$u$ of the second base 1221. In the present embodiment, the upper surface 1221$u$ defines a sensing zone 1221$a$ and a peripheral portion 122$p$, and the sensing structure layer 1222 is formed on the sensing zone 1221$a$. The sensing structure layer 1222 may sense the area touched with a finger or a stylus pen, so as to transmit a corresponding sensing signal to the signal line layer 130.

The sensing structure layer 1222 includes a plurality of first sensor rows 123 and a plurality of second sensor rows 124. The first sensor rows 123 are arranged in order and formed on the upper surface 1221$u$ of the second base 1221. The first sensor rows 123 include a plurality of first connecting lines 1231 and a plurality of first sensing units 1232. The first sensing units 1232 are arranged along a first direction D1 on the upper surface 1221$u$, wherein the first direction D1 is such as X-axis direction, and two adjacent first sensing units 1232 are connected to each other by the first connecting line 1231. The first sensor rows 123 may sense the area touched with a finger or a stylus pen.

The first connecting lines 1231 include a plurality of first peripheral connecting lines 1231'. The first peripheral connecting lines 1231' are formed on the peripheral portion 122$p$ of the second base 1221, so as to connect the signal line layer 130. Therefore, the first sensor rows 123 may transmit the sensing signal to the signal line layer 130.

The second sensor rows 124 are arranged in order and formed on the upper surface 1221$u$ of the second base 1221. The second sensor rows 124 include a plurality of second connecting lines 1241 and a plurality of second sensing units 1242. The second sensing units 1242 are arranged along a second direction D2 on the upper surface 1221*u*, wherein the second direction D2 is such as Y-axis direction, and two adjacent second sensing units 1242 are connected to each other by the second connecting line 1231. The second sensor rows 123 may sense the area touched with a finger or a stylus pen.

The second connecting lines 1241 include a plurality of second peripheral connecting lines 1241', wherein the second peripheral connecting lines 1241' are formed on the peripheral portion 122*p* of the second base 1221, so as to connect the signal line layer 130. Therefore, the first sensor rows 124 may transmit the sensing signal to the signal line layer 130.

In addition, the first connecting lines 1231 and the second connecting lines 1241 may be electrically isolated by an insulation layer (not shown), so that the first sensor rows 123 and the second sensor rows 124 will not cause a short circuit with each other.

Furthermore, the first sensing units 1232 and the second sensing units 1242 are made from such as a transparent conductive oxide (TCO) or a transparent organic conductive material. The transparent conductive material is such as indium tin oxide (ITO) or indium zinc oxide (IZO), and the transparent organic conductive material is such as Poly (3,4-ethylenedioxythiophene) poly (styrenesulfonate) (PEDOT). The first connecting lines 1231 and the second connecting lines 1241 are made from such as a metal or a transparent conductive material, and the metal may be selected from a group consisting of titanium, aluminum, molybdenum, copper, silver and a combination thereof.

The material of the signal line layers 130 include the metal mentioned above. The signal line layer 130 may be formed on the peripheral portion of at least one of the display panel 110 and the cover glass 121. In the present embodiment, the signal line layer 130 is illustrated as being formed on a peripheral portion 121*p* of the cover glass 121.

As indicated in FIG. 2, the cover glass 121 includes a first base 1211. The first base 1211 has a bottom surface 1211*b*. The material of the first base 1211 is similar to that of the second base 1221, and the similarities are not repeated here.

As indicated in FIG. 2, the area of the bottom surface 1211*b* of the first base 1211 is greater than the area of the upper surface 1221*u* of the second base 1221. The area of the sensing zone 1211*a* of the bottom surface 1211*b* is close to the area of the upper surface 1221*u* of the second base 1221. The signal line layer 130 is formed on a peripheral portion 121*p* of the bottom surface 1211*b* of the first base 1211.

As indicated in FIG. 2, the signal line layer 130 includes a plurality of first signal fines 131 and second signal lines 132. The preceding is described by taking the first signal lines 131 as an example. Compared to the conventional first signal lines 131 formed on the first base 1211 the first signal lines 131 in the present embodiment are formed on the cover glass 121, which may have a larger layout area for the first signal lines 131. Consequently, the every single first signal line 131 may be designed to have a broader width, in order to reduce the whole impedance of the sensing structure layer 1222 and the signal line layer 130. In one embodiment, if the first signal lines 131 are the metal signal lines, the width of each first signal line 131 may be greater than 30 micrometers (In the conventional design, as being limited by the size of the touch panel, the width of the metal connecting line is less than 30 micrometers.); if the first signal lines 131 are the transparent signal lines, the width of each first signal line 131 may be greater than 150 micrometers. (In the conventional design, as being limited by the size of the touch panel, the width of the transparent connecting line is less than 150 micrometers.) As for the upper limit of the width of the first signal lines 131, it may depend on the size of the substrate, and there is no further limitation in the present embodiment. Furthermore, the second signal lines 132 are similar to the first signal lines 131, and the similarities are not repeated here.

In the present embodiment, the whole impedance is reduced by forming signal line layer 130 on other elements besides the touch substrate 122. Although the thickness of the sensing unit (the first sensing unit 1232 and/or the second sensing unit 1242) may be less than 20 nanometers (In the conventional design, the thickness is at least greater than 35 nanometers), the whole impedance is still kept in an expected range or a default range.

As indicated in FIG. 2, the touch panel 120 further includes a printed circuit board 140, which is such as a flexible printed circuit board. In the present embodiment, the printed circuit board 140 is connected to the cover glass 121 and the signal line layer 130 is electrically connected to the printed circuit board 140. The sensing signals (not shown) from the sensing structure layer 1222 are transmitted to the printed circuit board 140 by the signal line layer 130.

As indicated in FIG. 2, the cover glass 121 further includes a light shading layer 125. (As the light shading layer 125 is covered by the first base 1211, all of the light shading layer 125 is not shown in FIG. 2.) The light shading layer 125 is formed on a peripheral portion 121*p* of the bottom surface 1211*b* of the first base 1211. The position of the signal line layer 130 may be corresponding to the light shading layer 125, which may prevent the signal line layer 130 from being exposed. In the present embodiment, the signal line layer 130 is formed on the bottom surface 1211*b* of the first base 1211, and the light shading layer 125 covers the signal line layer 130. In another embodiment, the light shading layer 125 may be formed on the bottom surface 1211*b* of the first base 1211 in advance, and then the signal line layer 130 is embedded in the light shading layer 125. In addition, the light shading layer 125 is such as a black matrix.

The light shading layer 125 may only be corresponding to the region of the signal line layer 130. Otherwise, the light shading layer 125 is such as a circular light shading layer, which is corresponding to whole peripheral portion of the bottom surface 1211*b* of the first base 1211.

The signal line layer 130 is made from such as a conductive material, such as copper or other metal materials. The signal line layer 130 may be formed by chemical vapor deposition, electroless plating, electrolytic plating, printing, spin coating, spray coating, sputtering, vacuum deposition, or other relative methods. Then, for example, photolithography, chemical etching, laser drilling or mechanical drilling may also be used to pattern the conductive material, in order to form the signal line layer 130. In another embodiment, the signal line layer 130 is a patterned copper foil layer, which may be formed by the transfer printing method.

Figure 3:
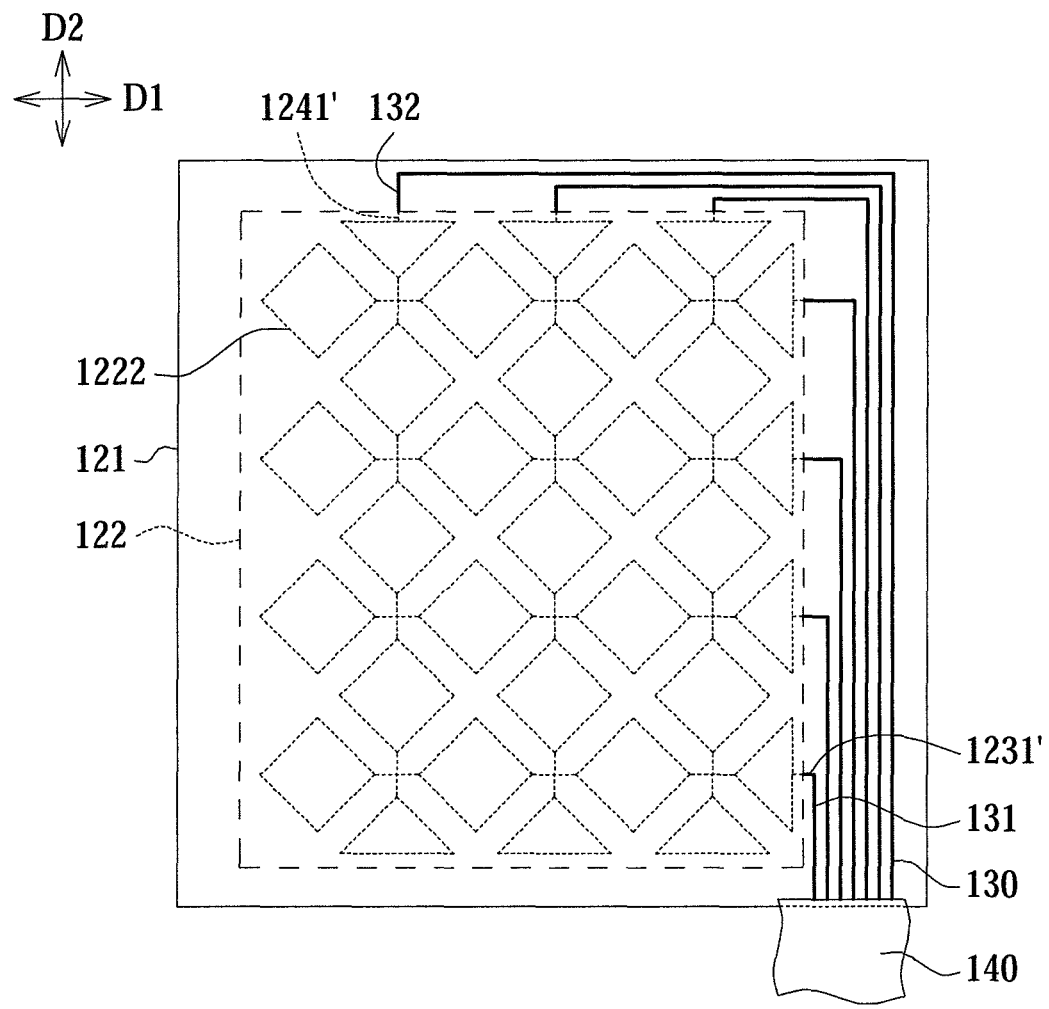
FIG. 3 shows a top view of the combination of the touch substrate and the cover glass in FIG. 2 (the light shading layer not shown)

Referring to FIG. 3 (the light shading layer not shown), FIG. 3 shows a top view of the combination of the touch substrate and the cover glass in FIG. 2.

Each first peripheral connecting line 1231' on the touch substrate 122 are connected to the corresponding first signal line 131 on the cover glass 121, and each second peripheral connecting line 1241' on the touch substrate 122 are connected to the corresponding second signal line 132 on the cover glass 121, wherein the sensing signals may be transmitted from the sensing structure layer 1222 and the signal line layer 130 to the printed circuit board 140.

Figure 4:
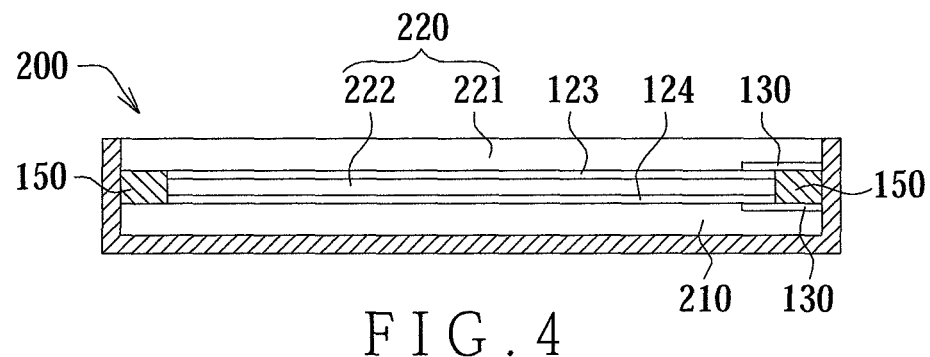
FIG. 4 shows a cross-sectional view of a touch display panel according to another embodiment of the invention.

Referring to FIG. 4, FIG. 4 shows a cross-sectional view of a touch display panel according to another embodiment of the invention. The touch display panel 200 includes a display panel 210, a touch panel 220, a signal line layer 230 and an adhesive part 150. The display panel 210 and the touch panel 220 are attached to each other by the adhesive part 150.

The touch panel 220 includes a cover glass 221 and a touch substrate 222. The touch substrate 222 may be attached to the cover glass 221 with a transparent optical cement (not shown).

Figure 5:
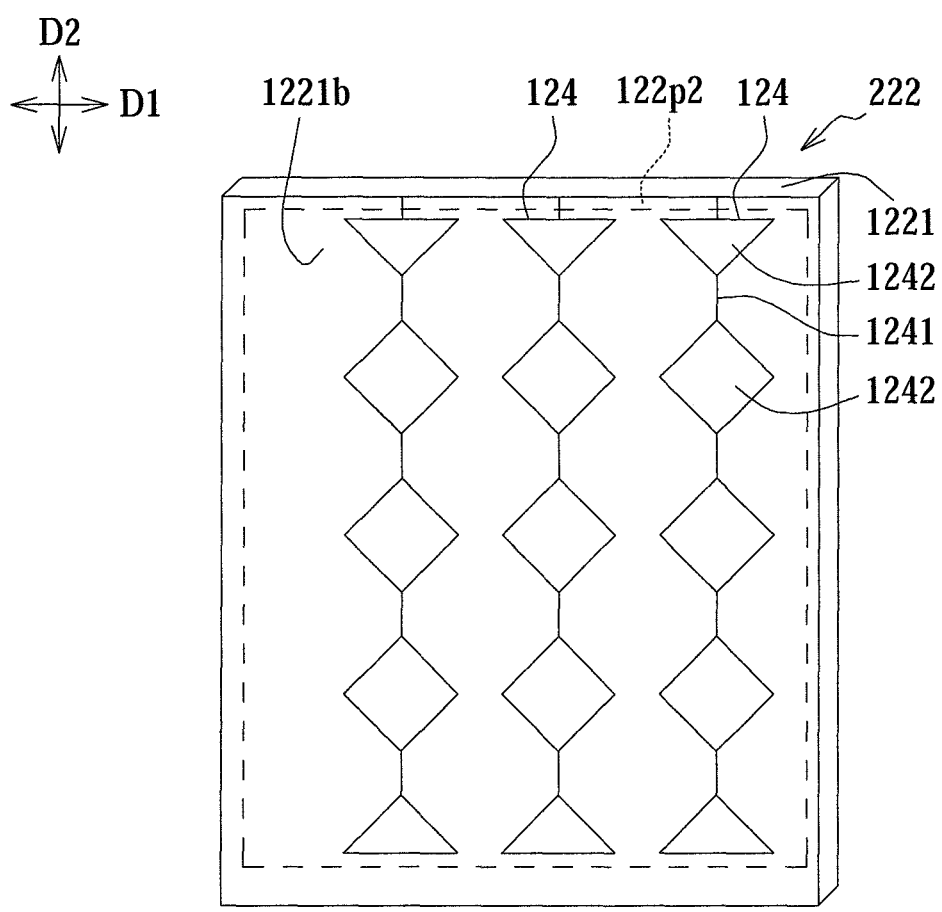
FIG. 5 shows the touch substrate in FIG. 4.

Referring to FIG. 5, FIG. 5 shows the touch substrate in FIG. 4. The touch substrate 222 includes a second base 1221 and a sensing structure layer 1222. In the present embodiment, the sensing structure layer 1222 is formed on the double sides of the touch substrate 222, as described below.

The second base 1221 has an upper surface 1221u and a bottom surface 1221b, which are opposite each other. The sensing structure layer 1222 includes a plurality of second sensor rows 124. The second sensor rows 124 are arranged in order and formed on the bottom surface 1221b of the second base 1221.

The second sensor rows 124 include a plurality of second connecting ones 1241 and a plurality of second sensing units 1242. The second sensing units 1242 are arranged along a second direction D2 on the bottom surface 1221b, and two adjacent second sensing units 1242 are connected to each other by the second connecting line 1241. The second sensor rows 124 may sense the area touched with a finger or a stylus pen so as to transmit a corresponding sensing signal.

The second connecting lines 1241 include a plurality of second peripheral connecting lines 1241'. The second peripheral connecting lines 1241' are formed on the peripheral portion 122p2 of the second base 1221. That is, the second peripheral connecting lines 1241' are extended the peripheral portion 122p2 in an upward direction. In another embodiment, the peripheral portion 122p2 may also be a bottom peripheral portion of the second base 1221. That is, the second peripheral connecting lines 1241' may be extended to the peripheral portion 122p2 in a downward direction.

Figure 6:
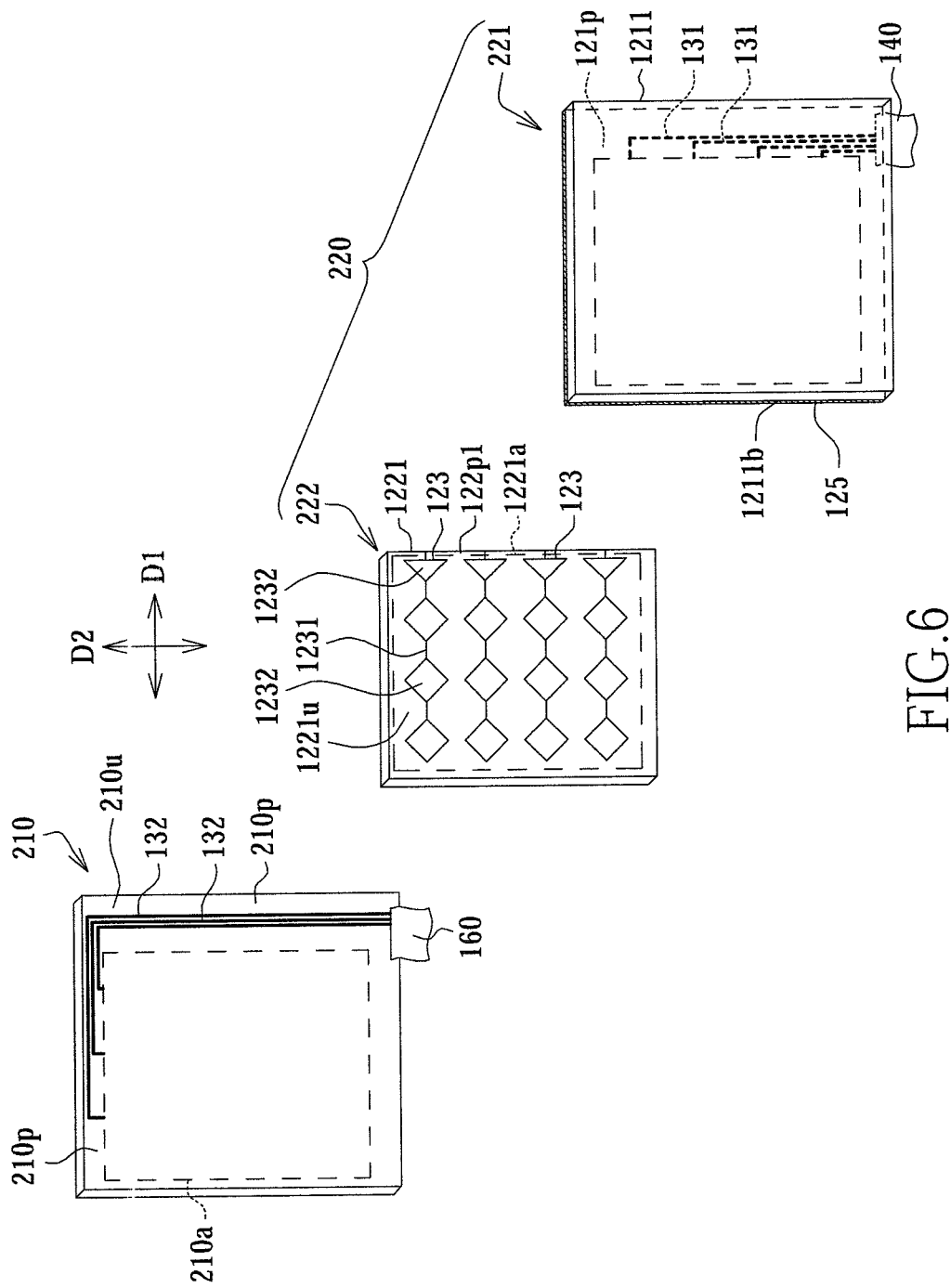
FIG. 6 shows a decomposition of the touch display panel in FIG. 4 (only illustrating the display panel, the touch panel and the cover glass).

Referring to FIG. 6, shows a decomposition of the touch display panel in FIG. 4 (only illustrating the display panel, the touch panel and the cover glass). The sensing structure layer 1222 further includes a plurality of first sensor rows 123. The first sensor rows 123 are arranged in order and formed on the upper surface 1221u of the second base 1221. (The second base 1221 shown in FIG. 6 is the back side of the second base 1221 shown in FIG. 5.)

The first sensor rows 123 include a plurality of first connecting lines 1231 and a plurality of first sensing units 1232. The first sensing units 1232 are arranged along a first direction D1 on the upper surface 1221u, and two adjacent first sensing units 1232 are connected to each other by the first connecting line 1231. The first sensor rows 123 may sense the area touched with a finger or a stylus pen so as to transmit a corresponding sensing signal to the signal line layer 130.

The first connecting lines 1231 include a plurality of first peripheral connecting lines 1231'. The first peripheral connecting lines 1231' are formed on the peripheral portion 122p1 of the second base 1221. That is, the first peripheral connecting lines 1231' are extended to the peripheral portion 122p1 in the right direction. In another embodiment, the peripheral portion 122p1 may also be the left peripheral portion of the second base 1221. That is, the second peripheral connecting lines 1241' may be extended to the peripheral portion 122p1 in the right direction.

As indicated in FIG. 6, the signal line layer 130 in the present embodiment is separately formed into two elements, such as the being separately formed on the display panel 210 and the cover glass 221.

The signal line layer 130 includes a plurality of first signal lines 131 and a plurality of second signal lines 132. The first signal lines 131 are formed on the cover glass 221 and connected to the first sensor rows 123. For example, the first signal lines 131 are connected to the corresponding first peripheral connecting lines 1231' (being similar to the structure in FIG. 3). The second signal lines 132 are formed on the display panel 210 and connected to the second sensor rows 124 (such as the second sensor rows 124 shown in FIG. 5). For example, the second signal lines 132 are connected to the corresponding second peripheral connecting lines 1241' (being similar to the structure in FIG. 3).

The display panel 210 has an upper surface 210u, and the signal line layer 130 is formed on the upper surface 210u of the display panel 210. The area of the upper surface 210 of the display panel 210 is greater than the area of the bottom surface 1221b of the second base 1221. The area of the sensing zone 210a of the upper surface 210u is close to the area of the bottom surface 1221b of the second base 1221, and the second signal lines 132 formed on the peripheral portion 210p of the upper surface 210u of the display panel 210.

As indicated in FIG. 6, the first signal lines 131 are extended to the printed circuit board 140, so that the sensing signals may be transmitted from the first sensor rows 123 and the first signal lines 131 to the printed circuit board 140. Furthermore, the display panel 210 further includes a printed circuit board 160. The second signal ones 132 are electrically connected to the printed circuit board 160, so that the sensing signals may be transmitted from the second sensor rows 124 and the second signal lines 132 to the printed circuit board 160. The printed circuit board 160 is similar to the printed circuit board 140, and the similarities are not repeated here.

In the present embodiment, the light shading layer 125 formed on the peripheral portion 121p1 of the bottom surface 1211b of the first base 1211 of the cover glass 221, (As the light shading layer 125 is covered by the first base 1211, the light shading layer 125 is not shown completely in FIG. 6.) and the light shading layer 125 covers the first signal line 131, which may prevent the first signal lines 131 from being exposed. In another embodiment, the light shading layer 125 may be formed on the peripheral portion 210p of the display panel 210, and the light shading layer 125 covers the second signal lines 132, which may prevent the second signal lines 132 from being exposed.

The touch panel and the touch display panel using the same, disclosed in the above embodiments, have signal transmission lines with the low impedance, so as to be capable of improving the transmission quality of the sensing signal.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
   a cover glass, comprising:
     a first base;
     a signal line layer, formed on a peripheral portion of the first base;
     a light shading layer, formed on the peripheral portion of the first base, wherein the position of the signal line layer is corresponding to the light shading layer, and wherein the signal line layer is embedded in the light shading layer; and a touch substrate, connected to the cover glass and comprising:
   a second base; and
   a sensing structure layer, formed on the second base.

2. The touch panel according to claim 1, wherein the second base of the touch substrate has an upper surface, and the sensing structure layer is formed on the upper surface of the second base, and wherein the first base of the cover glass has a bottom surface, and the signal line layer is formed on the bottom surface of the first base, and wherein an area of the bottom surface of the first base is greater than an area of the upper surface of the second base.

3. The touch panel according to claim 1, wherein the sensing structure layer comprising:
   a plurality of connecting lines; and
   a plurality of sensing units, two adjacent sensing units being connected to each other by the corresponding connecting line; and
   wherein the connecting lines comprises a plurality of peripheral connecting lines, and the peripheral connecting lines are formed on a peripheral portion of the second base and connected to the signal line layer.

4. The touch panel according to claim 3, wherein the thickness of each sensing unit is less than 20 micrometers.

5. The touch panel according to claim 1, further comprising:
   a printed circuit board, connected to the cover glass; and
   wherein the signal line layer is connected to the printed circuit board.

6. The touch panel according to claim 1, wherein the signal line layer comprises:
   a plurality of connecting lines; and
   wherein each connecting line is made from a metal and a width of each connecting line is greater than 30 micrometers.

7. The touch panel according to claim 1, wherein the signal line layer comprises:
   a plurality of connecting lines; and
   wherein each connecting line is made from a transparent metal and a width of each connecting line is greater than 150 micrometers.

* * * * *